United States Patent [19]
Willcox et al.

[11] Patent Number: 5,515,732
[45] Date of Patent: May 14, 1996

[54] CAPACITIVE PRESSURE SENSOR AND REFERENCE WITH STRESS ISOLATING PEDESTAL

[75] Inventors: Charles R. Willcox, Eden Prairie; Kevin R. Ley, Eagan; Eric P. Petersen, Minnetonka; Larry A. Peitersen, Chaska, all of Minn.

[73] Assignee: Rosemount Inc., Eden Prairie, Minn.

[21] Appl. No.: 471,608

[22] Filed: Jun. 6, 1995

Related U.S. Application Data

[62] Division of Ser. No. 267,174, Jun. 28, 1994, abandoned, which is a continuation of Ser. No. 938,869, Sep. 1, 1992, abandoned.

[51] Int. Cl.⁶ .......................................... G01L 9/12
[52] U.S. Cl. .................... 73/724; 73/718; 73/756
[58] Field of Search .............. 73/718, 724, 756, 73/431; 29/25.41, 621.1; 361/283.3, 283.4

[56] References Cited

U.S. PATENT DOCUMENTS

| | | | |
|---|---|---|---|
| 3,660,632 | 5/1972 | Leinkram | 219/85 |
| 4,019,388 | 4/1977 | Hall, II et al. | 73/398 AR |
| 4,168,630 | 9/1979 | Shirouzu et al. | 73/727 |
| 4,345,299 | 8/1982 | Ho | 361/283 |
| 4,384,899 | 5/1983 | Myers | 148/1.5 |
| 4,499,774 | 2/1985 | Tsuchiya et al. | 73/727 |
| 4,542,435 | 9/1985 | Freud et al. | 73/718 X |
| 4,586,109 | 4/1986 | Peters et al. | 361/282 |
| 4,617,606 | 10/1986 | Shak et al. | 361/283 |
| 4,730,496 | 3/1988 | Knecht et al. | 73/724 |
| 4,764,747 | 8/1988 | Kurtz et al. | 338/2 |
| 4,918,992 | 4/1990 | Mathias | 73/727 |
| 4,930,929 | 6/1990 | Maglic | 403/29 |
| 4,970,898 | 11/1990 | Walish et al. | 73/706 |
| 5,186,055 | 2/1993 | Kovacich et al. | 73/727 |

FOREIGN PATENT DOCUMENTS

| 5323286 | 3/1978 | Japan | 73/721 |
|---|---|---|---|

OTHER PUBLICATIONS

A New Integrated Capacitive Pressure Sensor With Frequency Modulated Output, A. Hanneborg, T. E. Hansen, P. A. Ohlckers, E. Carlson, B. Dahl and O. Holwech, pp. 186–188.

*Primary Examiner*—Richard Chilcot
*Assistant Examiner*—Joseph L. Felber
*Attorney, Agent, or Firm*—Westman, Champlin & Kelly

[57] ABSTRACT

A pedestal mount capacitive pressure sensor (10) is supported in a housing (11) and used to sense fluid pressures to provide air pressure data relating to the performance of air vehicles. The capacitive sensor uses a thick base plate (40) on which a diaphragm (48) is mounted. A capacitive electrode (52) is mounted to the diaphragm and pressure deflects the diaphragm to provide an output. The pressure sensor (10) is mounted in an outer housing (11) using a stress isolating pedestal (20).

17 Claims, 7 Drawing Sheets

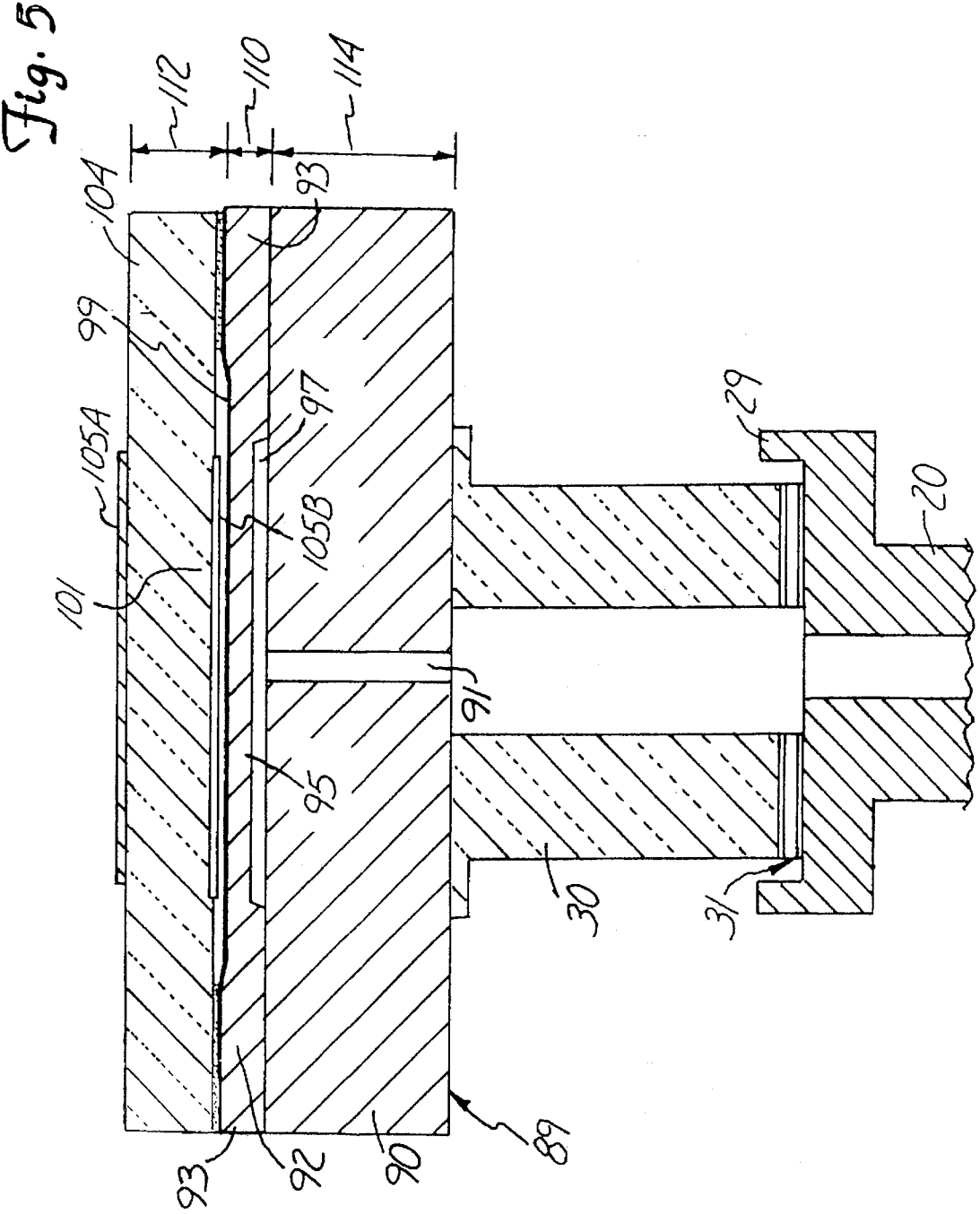

CAPACITIVE PRESSURE SENSOR AND REFERENCE WITH STRESS ISOLATING PEDESTAL

This is a divisional of application Ser. No. 08/267,174, now abandoned, filed Jun. 28, 1994 which is a file wrapper continuation of application Ser. No. 07/938,869, filed on Sep. 1, 1992, now abandoned.

BACKGROUND OF THE INVENTION

The present invention relates to a pedestal mount capacitive pressure sensor used primarily for sensing air pressures in air vehicle operations which is constructed to provide long-term stability, reduce temperature-induced errors and to provide a rugged, accurate pressure sensor assembly.

Solid-state capacitive type pressure sensors have been well-known in the art, and are widely accepted because of their ability to be miniaturized, and to be made using batch fabricating techniques to hold costs down. Such prior art sensors have used glass or semiconductor bases and formed diaphragm layers joined together around the rim of the diaphragm with anodic bonding, glass frit layers, metal diffusion and similar bonding techniques.

It also has been known in the art to metalize borosilicate glass (Pyrex) layers for forming capacitive electrodes for use with deflecting semiconductor diaphragms. Temperature stability is a problem for pressure sensors used in air vehicles because they are subject to wide, quite sudden swings in temperature. Temperature induced stresses caused by materials which have different temperature coefficients continues to be a problem, and stress isolation between the outer housing and the sensor die package is also necessary.

SUMMARY OF THE INVENTION

The present invention relates to capacitive pressure sensors used for sensing changes in fluid pressures across a wide range of temperatures. The temperature coefficient of the overall sensor assembly is reduced. The capacitive sensors are mounted on a glass tube pedestal which is secured in an outer housing to provide isolation from both mounting and temperature induced stresses between the metal housing and the sensor components.

The sensor assembly is anchored to the housing through bonding and brazing techniques to withstand high G-forces and shock loads.

The sensor includes a base backing plate, a diaphragm bonded to the backing plate around its rim and an electrode plate overlying the diaphragm. The diaphragm and electrode plates form a capacitive sensor which changes output as the diaphragm deflects relative to the electrode plate.

The ratio of thickness of the base support or backing plate relative to the diaphragm thickness and the thickness of the electrode plate bonded to the diaphragm is selected to assure a low temperature coefficient and provide for high stability at widely changing temperatures. Additionally, the thin metalization layer on the electrode plate used with the diaphragm is formed in a manner to minimize the effect of thin film stress relaxation over time for continued accuracy.

The housing for the pressure sensor assembly contains two mounted sensors, one of which is active and the other of which serves as a reference sensor. Because the two sensors are constructed identically and mounted side by side, their capacitive outputs, when ratioed electrically, will cancel out common mode errors such as arising from acceleration, mechanical stresses, thermal stresses and circuit dependent phenomena.

BRIEF DESCRIPTION OF THE DRAWINGS

FIG. 5 is a view of a further modified preferred form of a sensor used in the housings of FIGS. 1 and 2 taken along line 5—5 of FIG. 6;

DETAILED DESCRIPTION OF THE PREFERRED EMBODIMENTS

Figure 1:
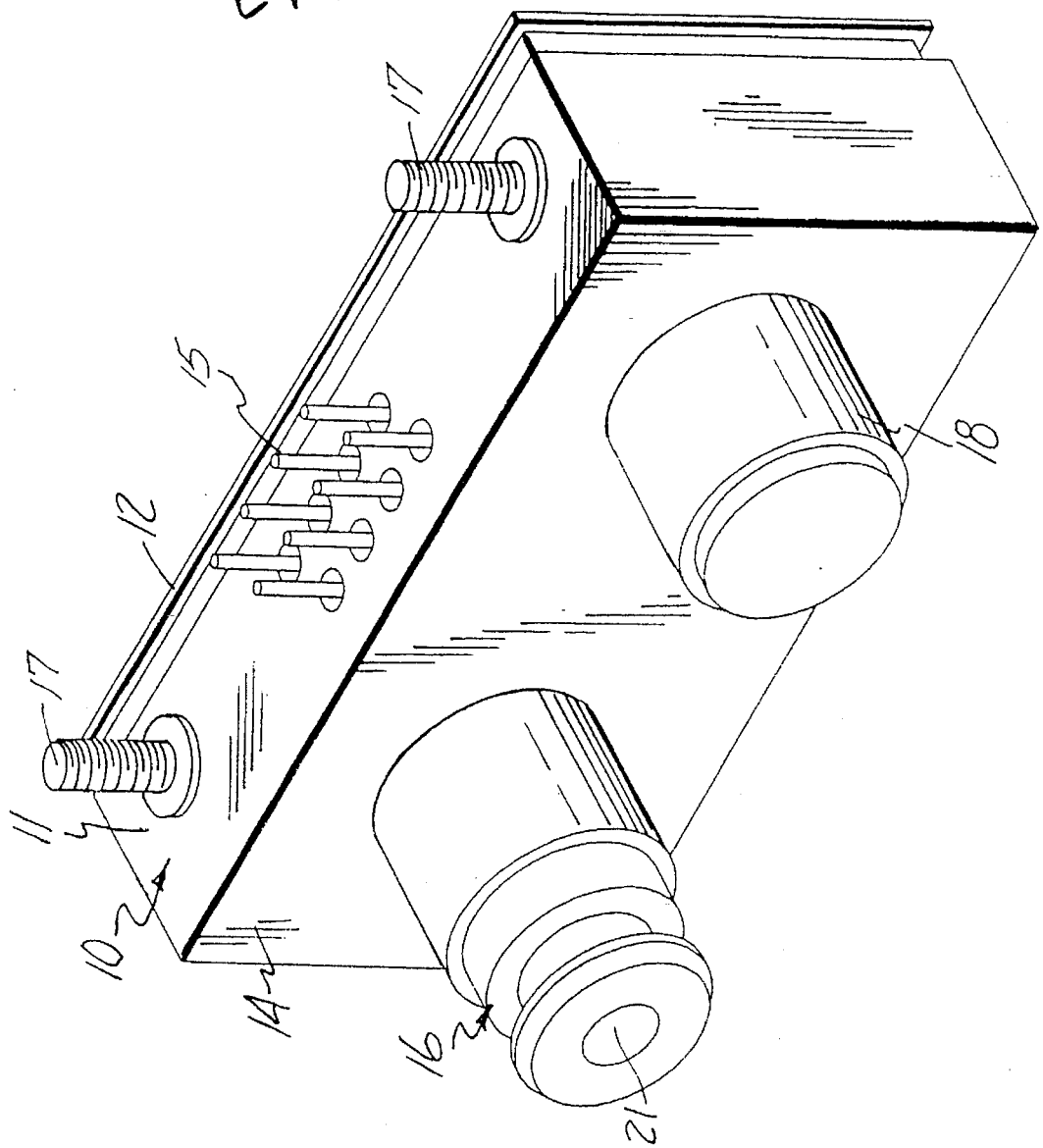
FIG. 1 is a perspective view of a typical housing assembly showing connections to the capacitive pressure sensors of the present invention.

In FIG. 1, a pressure sensor assembly for sensing pressures, primarily in air vehicle installations, is shown generally at 10 and comprises an outer housing 11, which has a sealed outer cover 12. A base plate 14 of the housing 11 has a stainless steel pressure connector fitting or housing 16 for a pressure sensing die (active pressure sensor) 36 protruding therefrom, and sealed relative to the housing bore. A stainless steel cap 18 for a static reference die (reference pressure sensing die) 36A also protrudes from the base of the housing 10. The housing base plate 14 is secured to housing sidewalls 13 by welding or brazing. One sidewall 13 has a plurality of electrical connections 15 sealingly passing through the sidewall. These connectors are used for carrying signals to and from the pressure sensing die 36 and the static reference die 36A. Also, this same wall 13 has a pair of threaded mounting studs 17 thereon mounted near the housing 11. These studs 17 have a head 17A and can be "stud welded" or brazed to the wall 13 and provide convenient supports for mounting the sensor housing. The connectors 15 can be accessed easily. The pressure connections extend substantially normal, preferably 90° from the electrical connectors 15, so access and mounting for each is simplified. When the pressure sensing die 36 and the static reference die 36A are sealed into the housing 11 and the cover sealed, the housing interior chamber is evacuated and sealed so that the sensing dies have a vacuum reference.

Figure 2:
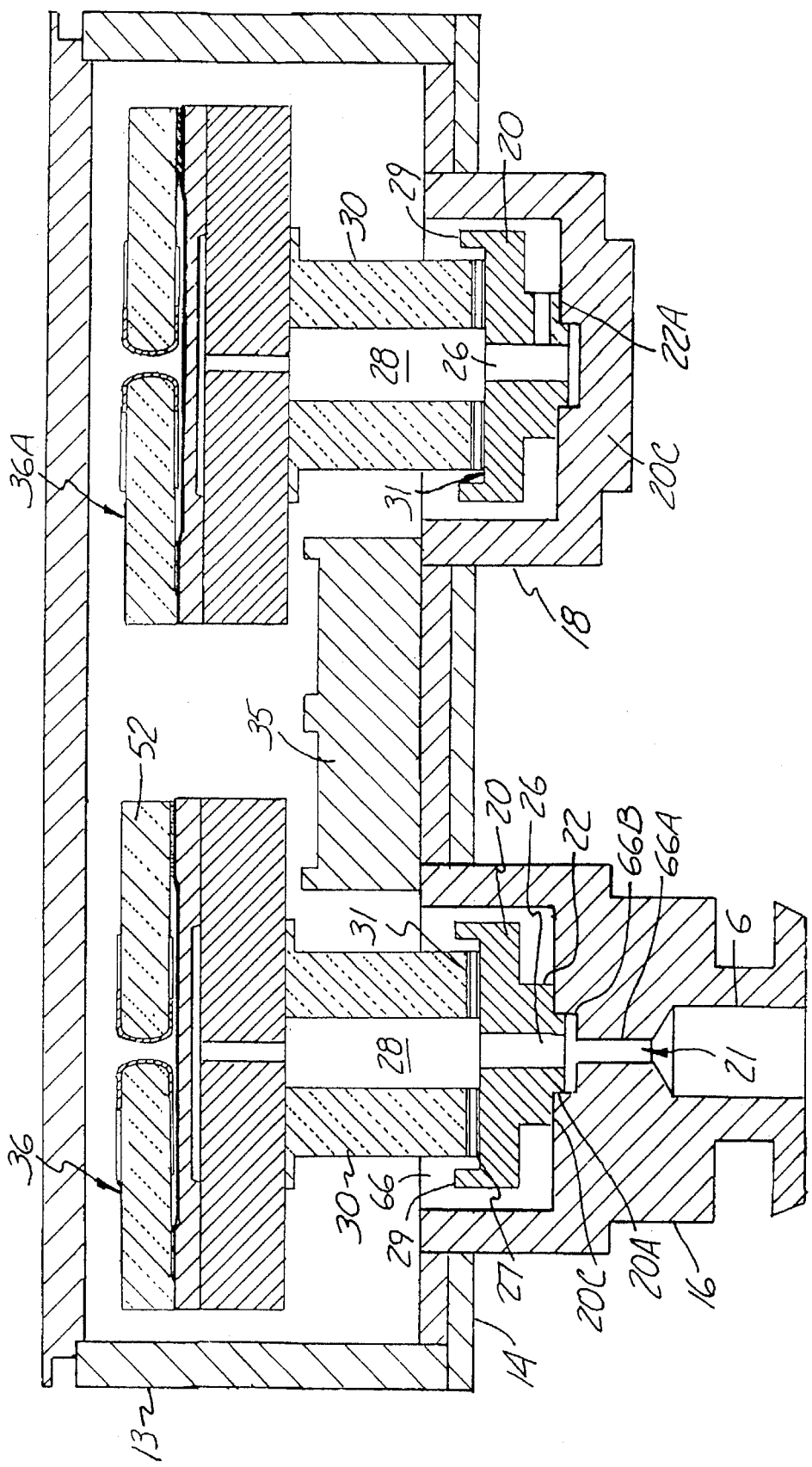
FIG. 2 is a vertical sectional view through the housing of FIG. 1 schematically showing the positioning of an active pressure sensor and a reference pressure sensor within the housing.

In FIG. 2 the pressure connector 16 has an O-ring groove so a fitting from a pneumatic line of a pitot tube can be slipped on. The connector 16 has an interior bore 21 that includes a shoulder formed where the bore widens out. A nickel plated metal (preferably a nickel-iron alloy sold under the trademark Kovar) pedestal 20 is supported on a radial shoulder surface 22. The cap 18 of the static reference die also has an interior cavity that receives a nickel-iron pedestal 20 which is supported in the bore of cap 18 on a radial shoulder surface 22A. The cavity of cap 18 is closed to the outside atmosphere at one end but has internal venting to the vacuum reference inside the package to assure that the reference die diaphragm has zero differential pressure. The static reference die 36A and pressure die 36 are batch-fabricated from the same wafer stack and are identical except for the pressure fitting and cap.

The pedestal 20 of pressure die 36 is secured to the radial shoulder surface 22 in connector 16. Likewise, pedestal 20 of static reference die 36A is secured to a similar radial shoulder surface 22A in the cap 18.

The pedestal 20 has a through opening or bore indicated at 26 thereto which leads to a bore 28 of a glass (preferably a borosilicate glass sold under the trademark PYREX) pedestal 30 on each of the reference and pressure sensors. Again, the pressure die 36 will be described, but the static reference die 36A is identical except for cap 18. A support block 35 is also shown in FIG. 2. The support block may be used for supporting a circuit board which provides signal processing of the capacitive outputs from the two sensing die.

Figure 3:
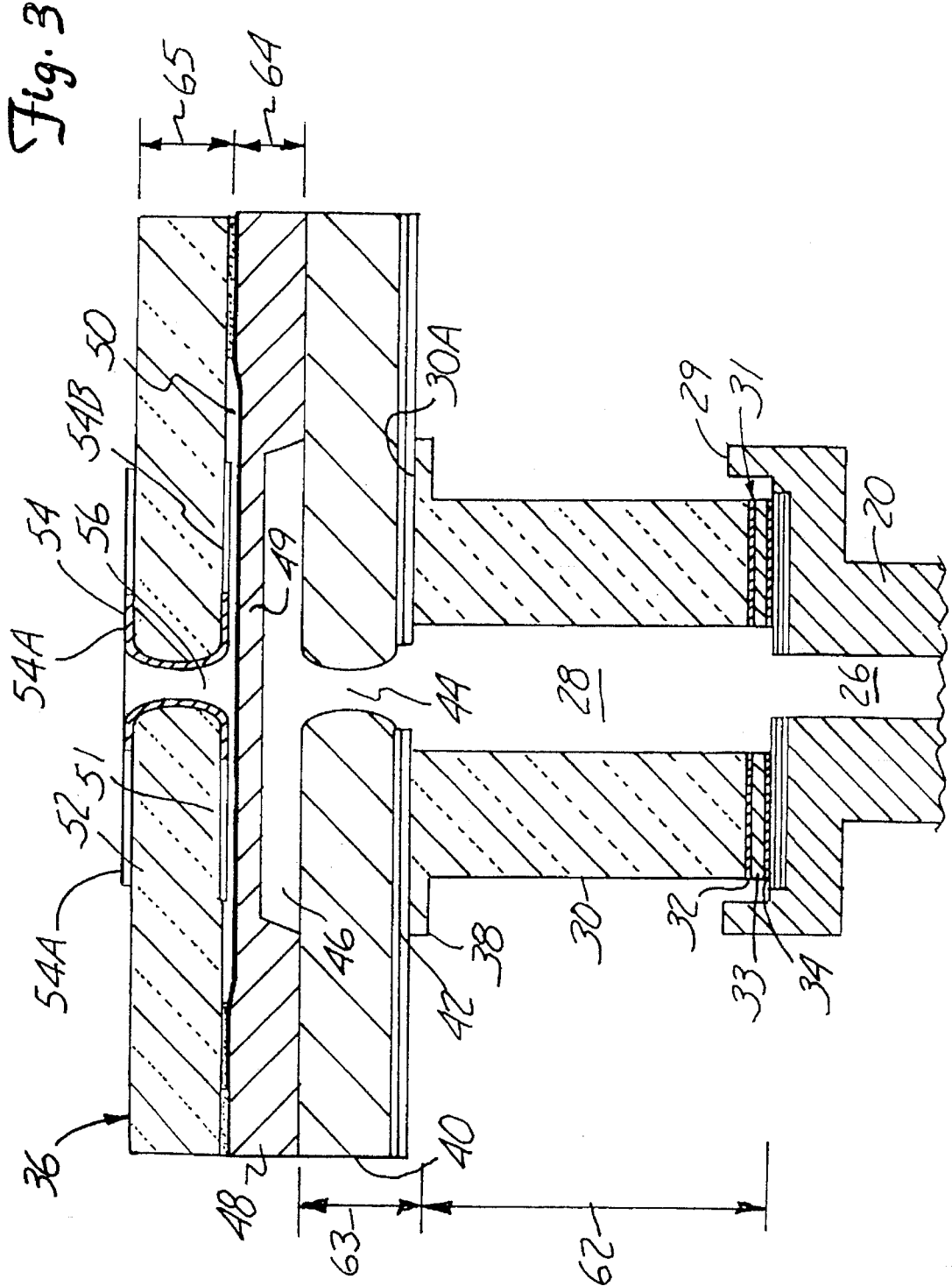
FIG. 3 is a vertical sectional view of a first form of a typical pressure sensor used in the housing of FIGS. 1 and 2.

In FIG. 3, pedestal 20, with annular lip 29, is preferably made out of a nickel-iron alloy sold under the trademark Kovar. The glass to metal seal indicated at 31, is a tri-layer of metal on the surface of the glass pedestal 30, which includes a bonded, deposited thin first layer of zirconium, (See FIG. 4), indicated at 32. Zirconium can be deposited on the glass and bonds permanently to the glass. A layer of nickel 33 is then deposited using known techniques on the zirconium to provide a solderable or solder wettable layer. The nickel-zirconium interface is also a permanent bond. An outer coating of gold 34 is provided over the nickel layer 33 to prevent oxidization of the nickel. The nickel plated pedestal 20 also has a tri-metal layer formed thereon prior to soldering the metal pedestal to the glass. The tri-metal layer may be a layer of titanium deposited on the surface of the pedestal 20, then a layer of nickel and then a gold over layer. The tri-metal layer is illustrated on the metal pedestal only in FIG. 3 for convenience, but each metal pedestal has three layers of materials thereon where it supports and is brazed to the glass pedestal as shown on the glass pedestal and in FIG. 3.

The pressure die 36 and the static reference die 36A are identically constructed for purposes of having accelerations, temperature and other forces and effects reacted identically by the two sensors to achieve common error cancellation and thereby ensure accurate responses across a wide temperature range and a range of other conditions.

Referring to FIG. 3, a first form of the pressure sensor or die 36 is shown. The Pyrex pedestal indicated at 30 has a flange 38 supporting a backing plate 40 for the pressure sensor or die 36. The backing plate 40 is, in the form shown in FIG. 3, made of Pyrex. A novel glass to glass anodic bond or bond process at the interface between the surfaces of the pedestal 30 and the backing plate 40 secures the pressure die 36 to the pedestal 30. The anodic bond is indicated schematically at 42. In this form of the pressure sensor, the backing plate 40 has an opening 44 that leads from borosilicate glass pedestal 30 to a pressure chamber 46 formed relative to backing plate 40 by a diaphragm 48 constructed of silicon or other suitable semiconductor. A thin diaphragm web section 49 is formed by etching a cavity into one side of a silicon wafer for forming chamber 46. The diaphragm web section 49 also is formed in part by a shallow recess 50 etched into the upper surface or active face of the diaphragm. The upper surface of the diaphragm has a doped layer 51 for increasing its conductivity for use as a capacitive plate, and the upper recess is enclosed with a glass electrode plate 52 preferably made of a borosilicate glass sold under the trademark PYREX.

The glass electrode plate 52 is bonded to the rim of the silicon diaphragm, after being metalized with a deposited metal layer indicated at 54 which has an upper side layer 54A, and which extends along the wall surface bounding an opening shown at 56. The opening 56 provides a reference pressure (from the sealed housing) to the upper side of the diaphragm. The metalizing layer 54 includes a lower section or portion 54B that is matched in size and thickness to the upper layer 54A and which is electrically connected to the upper layer 54A by the metalized layer in the opening 56. The upper layer section 54A has a lead path or tab of suitable small size deposited on the electrode plate surface and leading from the layer 54A. An aluminum bonding pad is applied to the deposited tab used for connecting a suitable lead to layer 54. A bonding pad is shown typically in FIG. 6.

A lead bonding pad is also attached to doped layer 51 adjacent to the periphery of the diaphragm and is situated to the outer side of the electrode plate 52.

In this form of the invention, the glass pedestal axial length indicated at 62 is approximately 0.275 inches, and the backing layer 40 has a thickness indicated at 63 of about 18 mils, while the diaphragm at its rim is about 12.5 mils thick as indicated at 64, and the electrode thickness is 18 mils as indicated at 65. These thicknesses are selected, particularly in the modified forms of the invention, for obtaining desired sensor precision and long-term stability and temperature coefficient properties over wide temperature changes.

After forming the three layers of metal on the bottom surface of the glass pedestal, the nickel/gold layers are soldered to the nickel plated metal pedestal 20, whose surface has also been coated with three metal layers in a like manner as the glass pedestal base, by use of a gold/tin eutectic solder for a very secure mounting. A feature of the present device is that zirconium can be used for adhesion between the glass and the nickel layer, which provides a solder attachment material. Zirconium forms strong, thermodynamically stable oxides which will remain bonded to the glass pedestal during deposition on the soldering of the end of the glass pedestal to metal pedestal 20. Zirconium metalization replaces titanium, which is commonly used for bonding metal to glass.

It should be noted that the pedestal 20 has machined surfaces which provide for very precise alignment with and piloting in the sections of the bore 21 of the stainless steel pressure fitting 16. As shown in FIG. 2, typically stainless steel pressure fitting 16 has a pressure bore section 66, of large diameter, which reduces in size to a passageway 66A, and then expands to a recess 66B which can be precisely machined on an inside diameter, so it will receive a pilot neck or collar 20A of the pedestal 20 that fits closely within this bore 66B.

In fact, the pilot bore 66B outside diameter can be machined to very precise tolerances, and a shoulder surface 20C can be machined precisely relative to the central bore 26. Further, the distance between the radial shoulder surface 22 and the support surface for the end of the metalization layer 31 can be precisely controlled, and the surfaces can be kept parallel to each other as well as perpendicular to the axis of bore 21.

The cylindrical surfaces piloting the pedestal 20 into place and planar surfaces that are parallel to the supporting surface in the pressure fitting 16 for supporting the pedestal 20 provide a very stable, and properly aligned pedestal 30 for supporting the pressure die 36 and static reference pressure die 36A. Also, the upper end of pedestal 20 has a flange 29 surrounding the tube, the glass pedestal 30 is supported within the flange.

The pedestal 20 forms a first stress isolation transition piece between the relatively high temperature coefficient of expansion of stainless steel, as used in the fitting 16, and the much lower temperature coefficient Pyrex pedestal tube 30. The Pyrex tube provides further stress isolation to the pressure dies 36 and 36A, and the Kovar fitting has an intermediate coefficient of thermal expansion to provide for a thermal stress transition between the two substantially different thermal coefficient expansion materials.

The glass pedestal 30 also provides isolation from stresses induced by the packaging or housing in which the pressure sensing dies are mounted.

While zirconium is a preferred metal for applying a layer that will bond nickel (or other suitable metal) to the borosilicate glass, hafnium, niobium, tantalum, vanadium, chromium, molybdenum and tungsten could also serve this purpose.

In the form of the invention shown in FIG. 3, there is a glass-to-glass anodic bond between the base layer 40 and the upper surface 30A of pedestal 30, which includes a flange 38.

Figure 4:
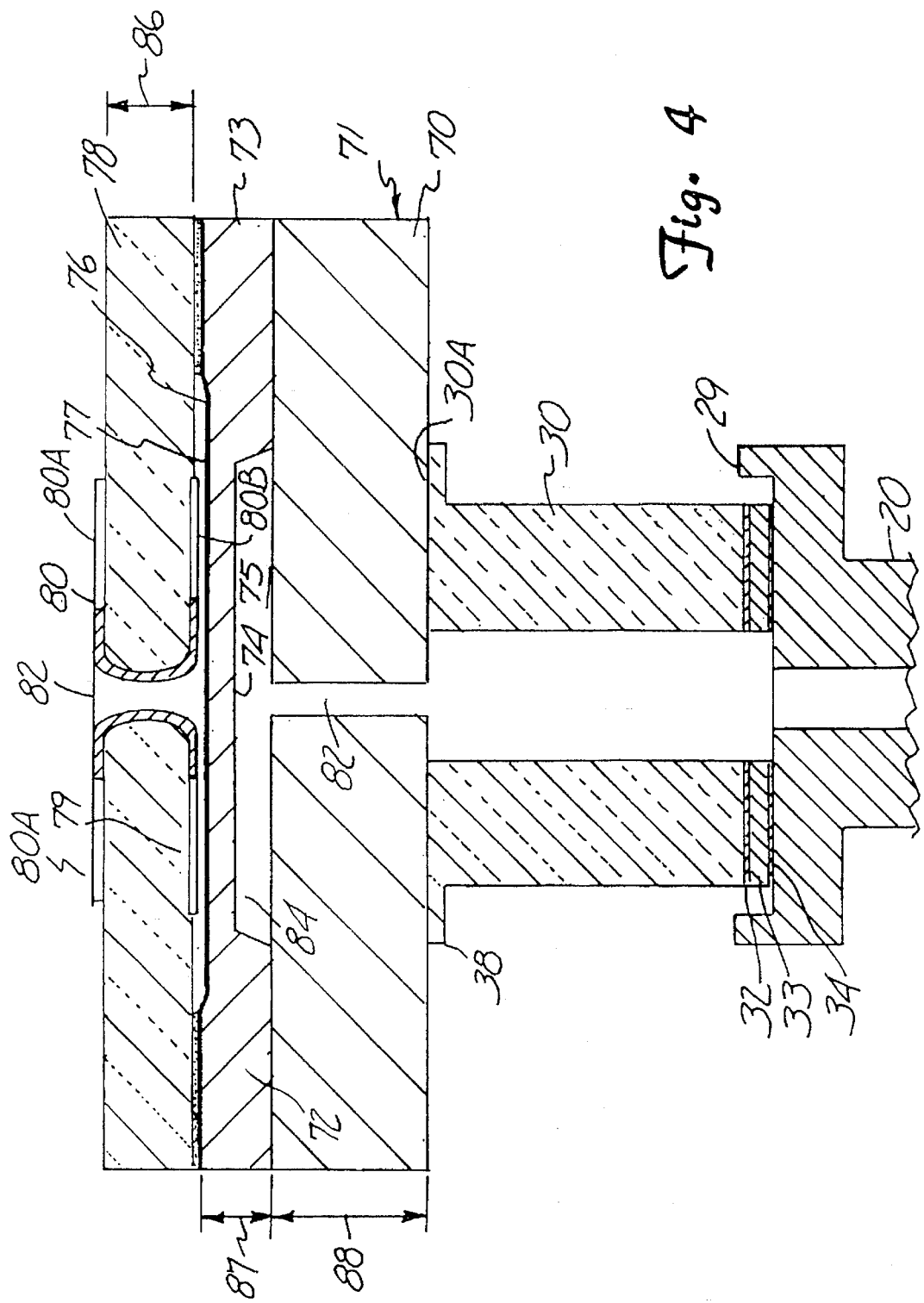
FIG. 4 is a cross-sectional view of a modified pressure sensor used in the housings of FIGS. 1 and 2.

In FIG. 4, a modified form of the invention is shown, and includes the same glass pedestal 30 as previously, but in this case, the upper surface 30 of the pedestal is bonded to a silicon backing or base plate 70 for a pressure die 71. The silicon backing plate 70 is supported on the end of the pedestal 30 through an anodic bond. Silicon will bond firmly to borosilicate glass using the well-known anodic bond process. The backing plate 70 is relatively thick (measured perpendicular to the plane of the plate) compared to the silicon diaphragm indicated at 72, which is directly silicon-silicon fusion bonded to the backing plate 70. The diaphragm 72 has a boundary rim 73 and a thin diaphragm web section 74 that is recessed inward from both surfaces of a wafer having the thickness of the rim. The recess indicated at 75 is the larger recess and is directly above the backing layer 70, to form a pressure chamber 84. A very shallow recess 76 is formed on the opposite side of the diaphragm to provide clearance for capacitive web deflection under pressure. A Pyrex electrode plate 78 is provided over the upper surface of the diaphragm 72, and is bonded to the diaphragm at the rim 73.

The borosilicate glass electrode plate 78 is made as previously explained, and has a metalized layer indicated at 80, formed as previously explained with a top section 80A and an identically shaped and formed lower capacitive plate section 80B. Pressure ports 82 are provided in the backing layer 70 to provide pressure to be communicated to the chamber 84 formed by the recess 75. Reference pressure from the outer housing acts through the opening in the electrode plate.

Figure 6:
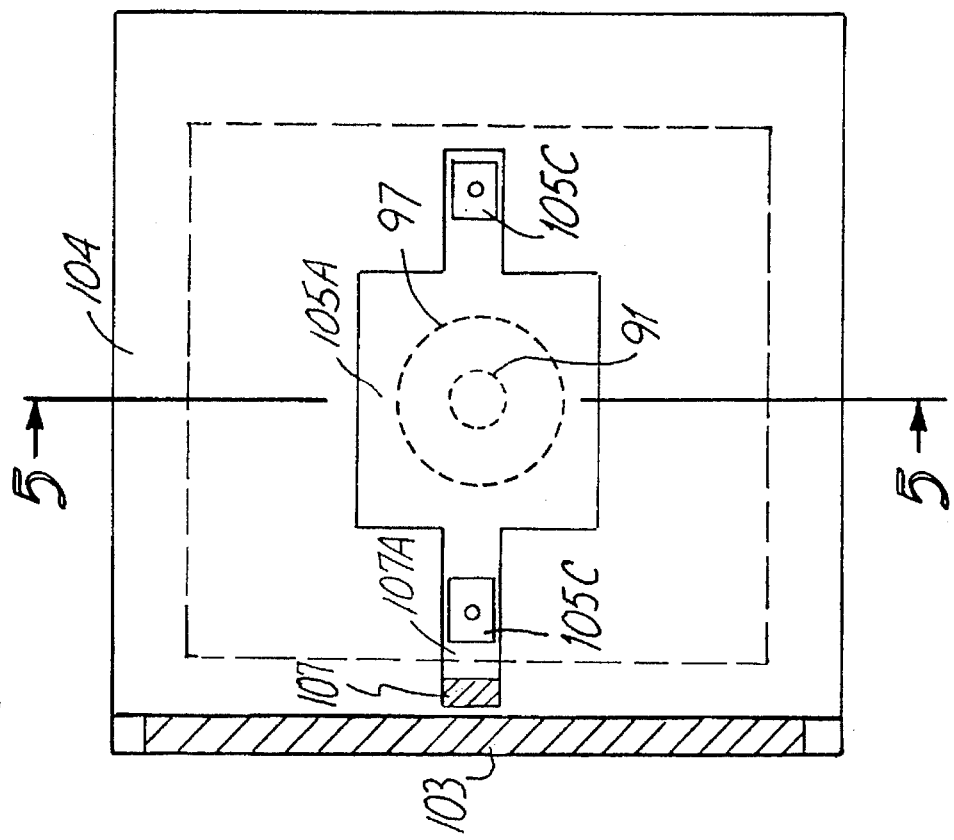
FIG. 6 is a typical top plan view of the configuration of the sensors shown in FIGS. 3–5.

An aluminum bonding pad is provided on a tab leading from the metalized layer 80 of the electrode, at one side as previously explained and as shown in FIG. 6. A bonding pad also is used for providing electrical connection to the active surface of diaphragm 72 facing the electrode plate, also as shown in FIG. 6.

In this form of the invention, the electrode plate 78 is also maintained at a thickness of 18 mils as indicated at 86, and the diaphragm rim is also 12.5 mils thick as shown at 87 and is constructed substantially the same as that shown in FIG. 3. However, the silicon backing plate is quite thick, and is substantially double the thickness of the Pyrex electrode and about three times the thickness of the diaphragm rim and as shown is in the range of 35 mils as shown at 88. The other dimensions such as the pedestal 30 length would be the same as before. The outside length and width dimensions of the backing plate 70, or the glass backing plate 40 for these sensors typically are in the range of 0.45 inches square.

The heavy silicon backing plate 70 provides for a reduction in the overall temperature coefficient of the sensor. This in turn improves the performance of the sensor when the sensor is rapidly forced to a cold condition from high temperature ambient conditions, as would be present when a high-performance aircraft is, for example, departing from a desert runway and climbs immediately into altitudes in the range of 40,000 feet or more. Additionally, the fusion bond between the silicon diaphragm and the silicon base plate provides a very stable bond, with little temperature shift in view of the fact that both parts are made of the same materials. The fusion bond is accomplished by heating the interfacing surfaces to a point where they actually fuse together.

It should be noted that the silicon diaphragm is provided with a "doped" layer on the surface facing the Pyrex electrode, which is indicated by a heavier line 77. The recess 76 forms a capacitive gap in a chamber 79 with the metalized layer on the Pyrex electrode 78. The gap spacing is in the range of eight microns. The recesses in the diaphragm are formed through suitable chemical etching techniques. This is done in a batch process. The silicon backing plate 70 is preferably P-type silicon, but N-type may be used as understood in the art.

If P-type silicon is used, the layer 77 is doped with boron or other suitable dopant to increase conductivity of the diaphragm surface which is used as a capacitive sensing surface. If the N-type is used, phosphorus is the dopant of choice. The doping prevents surface depletion effects which, if unmanaged, would cause shifts in the calibration of the sensor.

The metalization layer on the opposing surfaces of the glass electrode in all forms of the invention is a nickel chromium metalization, that is presently done in the art for forming resistors on glass layers.

The ratio of the thickness of the silicon backing plate to the thickness of the diaphragm is at least two and one half to one and the ratio of thickness of the silicon backing plate to the electrode plate is about two to one. The thick backing plate aids in temperature stability when the backing plate is made of the same material as the diaphragm so they can be fused together, with no layer of frit or bonding material between them. The borosilicate glass electrode plate is also substantially thinner than the backing plate.

The entire sensor 71 is made without the need for frits or other bonding agents.

In FIG. 5, a further modified form of the pressure die (and also reference die) is disclosed. The form of the sensor of FIG. 5 is most preferred, by providing greater temperature stability and using a predetermined diaphragm rim thickness relative to the diaphragm deflecting web thickness, as well as the additional benefits of reducing the thickness of the electrode plate.

In the form of the invention of FIG. 5, the glass pedestal 30, which is the same as previously described, is anodically bonded to a thick silicon backing plate 90 of a pressure sensor or die 89, which has a pressure passage 91 in the center. The silicon backing plate 90 is in turn fusion bonded to a silicon diaphragm 92 around a diaphragm rim portion 93. The diaphragm has a thinner web section 95. The diaphragm web section 95 has a desired thickness and is formed by etching a pressure chamber recess 97, and a capacitive sensing chamber recess 99. The surface of the diaphragm web facing away from the silicon backing plate 90 has a doped layer 101 thereon, for increasing conductivity, and an aluminum bonding pad 103 (FIG. 6) is connected to this doped layer outside the periphery of the borosilicate glass electrode 104. The electrode 104 has a metalized layer 105 that is formed as described in connection with FIG. 3, and is metalized through one or more provided openings (two openings as shown in FIG. 6), so that the metalized layer has two substantially symmetrical sections 105A, and 105B. The layer 105B is a sensing layer forming a capacitive plate that faces the doped layer 101 on the diaphragm 92. If desired, the openings in the glass electrodes can be sealed or eliminated to provide an internal vacuum in the chamber below electrode plate 104.

In FIG. 6 a bonding pad 107 bonded to the metalized layer 105A is shown provided at the edge of the glass layer as well. A tab of metal is formed on that layer for the bonding pad 107.

Referring back to FIG. 5, in this form of the invention, the diaphragm support edge or rim 93 has been reduced in thickness. It is specifically desired to be a function of the thickness of the center diaphragm or web section 95 correlated to the depth of the etch forming the capacitive sensing recess or chamber 99. The thickness of rim 93 is formed to be the thickness of the central web portion 95 of the diaphragm plus two times the depth of etch of the capacitive sensing chamber 99, which is preferably eight microns deep. Thus, the diaphragm rim thickness indicated at 110 is the central web thickness plus 16 microns, or in this instance a 6.5 mil thickness.

The thickness of the glass electrode has been reduced to 12 mils, as indicated by the dimension 112, and the thickness of the silicon backing plate has been increased to 50 mils, as indicated by the dimension 114.

All of the parts are bonded together, either by anodic bonds where glass to silicon junctions are made, or by fusion bonding for the silicon-to-silicon interface between the diaphragm and the backing plate, to eliminate any need for material that may cause thermal instability, such as glass frits.

By finite element modeling, it has been established that the temperature coefficient has been reduced, and is actually about half of the sensor illustrated in FIG. 4, and about a fourth of the temperature coefficient of the device shown in FIG. 3.

By having the glass electrode plate in the range of one-fourth of the thickness of the backing plate 90, and the diaphragm rim in the range of one-half of the thickness of the glass electrode based on the thickness of diaphragm web section 95 and the depth of capacitive chamber 99, a very temperature stable sensor results.

When the sensor of FIG. 5 is assembled as shown in FIG. 2, and a static reference die constructed in this manner is also used as shown at 36A, very stable performance is achieved. In the overall package, additional steps are taken to ensure adequate long-term stability. One improvement that is used with the present invention is to minimize the effect of thin-film stress relaxation over time in relation to the thin nickel chromium metalized layer placed on the glass electrode plate.

Figure 7:
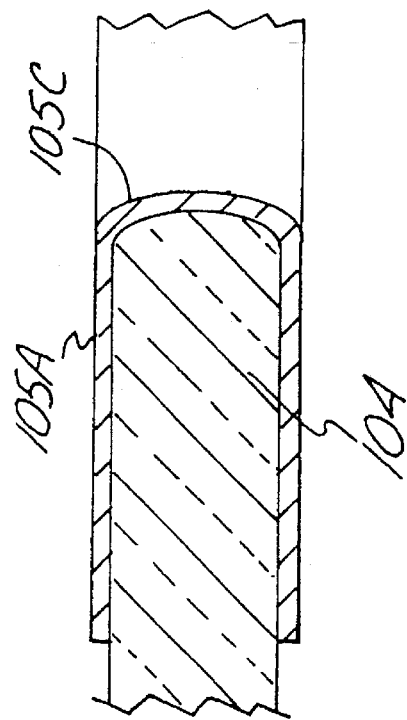
FIG. 7 is an enlarged fragmentation sectional view of the metalized portions for the electrode shown in the sensors of FIGS. 3, 4 and 5.

FIG. 6 is a representation of the typical plan view of one of the miniature sensors utilized in the present invention, and is specifically a plan view of FIG. 5. The metalized layer 105A is shown on the top. It has a larger center portion and narrower end portions, as shown. The end portions have the pressure openings therein as shown, the openings 105C. The passages or openings 105C are also shown. A short tab 107A is formed on one edge of the metal layer 105 with the aluminum bonding pad 107 thereon. The metal layer section 105A is formed to be identical in size and shape, and in registry on both the top and bottom of the glass electrode plate as shown in an enlarged view in FIG. 7. The metal depositing pattern is identical on the top and the bottom of electrode plate 104, except for the small tab for the aluminum bonding pad 107. By replicating the metal pattern from one side of the glass electrode plate onto the other side, the thin-film stresses cancel, provided they are deposited under nearly identical conditions and are of the same thickness. The metal deposition is carefully carried out in the process, so that the metalized layers on each of the electrode plates 104 is the same on the top and bottom. This can be done at the wafer level during the batch fabrication process by suitable masking and using identical deposition techniques on opposite sides of a large borosilicate wafer from which the electrode plates are made. In this way, several electrode plates may be formed on a wafer for later separating into the individual pressure-sensing dies.

The stress-compensating features of having the metalized layers on the opposite sides of the glass electrode plate reduces effects which are caused by differences between the coefficient of thermal expansion of the metalization layer and the glass. In other words, the stress from different temperature coefficients will be balanced on opposite sides of the Pyrex electrode plate. The electrode plate will not be caused to bow or deform due to the metalization from its reference position because of metalization on only one side.

In this invention the diaphragms of the pressure sensing die and the reference die are etched on the same silicon wafer, at the same time, and next to each other in all steps of the processing so that when the diaphragm wafer is bonded to the electrode and the backing wafers, adjacent die will react identically to temperature and other environmental conditions. When separated from the wafer, adjacent die are kept in pairs and mounted into the sensor package, one becoming a pressure sensing die, the other a reference die.

A highly stable pressure sensing die is provided, utilizing the principles of having a rigid base plate and selecting the preferred ratios of diaphragm thickness and thickness of the overlying glass electrode utilized, to minimize temperature effects.

Figure 8:
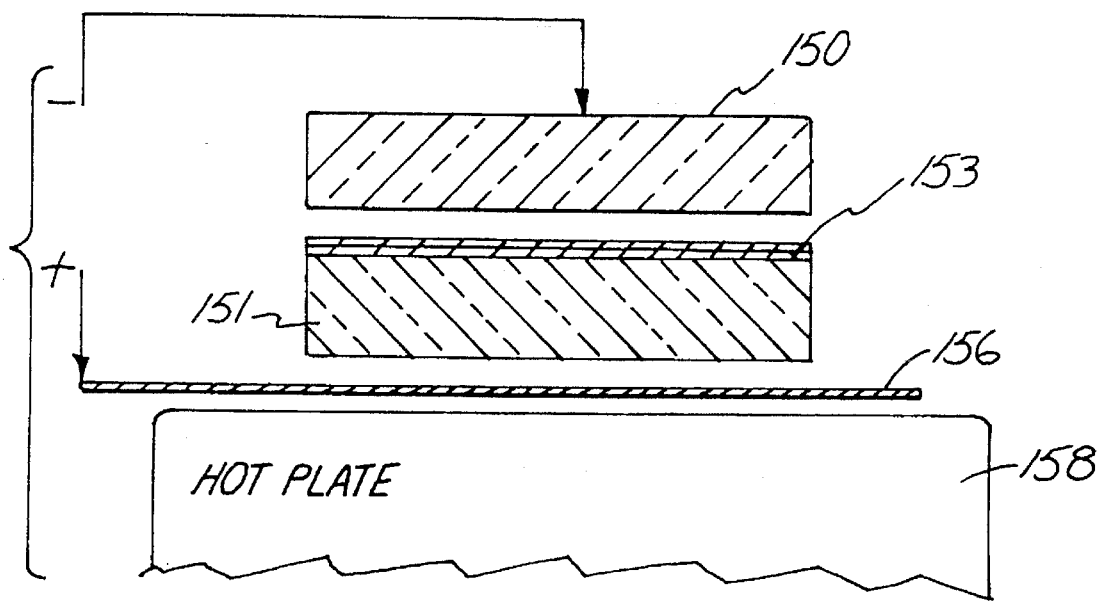
FIG. 8 is a schematic representation of a glass to glass anodic bonding process.

As shown in FIG. 8, a procedure for anodically bonding glass to glass is presented. This is used in the sensor of FIG. 3 for bonding the base layer to the glass pedestal.

In FIG. 8, schematically, there is shown a glass layer 150 and a second glass layer 151 that are going to be anodically bonded together. On the surface of one of the glass layers or wafers, a layer of titanium that is approximately 375 Å thick (preferably kept within +or −50 Å) is deposited and oxidized in air to form titanium dioxide ($TiO_2$). Subsequently, a layer of $Si_3N_4$ that is approximately 3200 Å (preferably kept within +or −250 Å) thick is plasma deposited at a temperature that is as close to the bonding temperature as possible. These layers form an ion barrier on the glass wafer 151 and are shown at 153. The other glass layer, 150, which is shown at the top layer is then placed in contact with the layer of $TiO_2$ and $Si_3N_4$, and these two layers are set on top of a gold foil layer shown schematically at 156. Alternatively, 250 Å of gold can be deposited on the side opposite layers 153 to replace the gold foil. The two wafer stack is then set on top of a hotplate or heater that can reach temperatures in the range of 375° C. This heater is shown at 158.

The hotplate 158, with the parts resting together and stacked as seen in the exploded view of FIG. 8, is ramped up to a peak temperature of approximately 375° C. When the temperature of the hotplate reaches 250° C. and thereafter, a voltage of about 800 volts is applied across the wafer stack with the polarities as shown in the drawings. The positive polarity is connected to the gold foil side 156 and the negative polarity is attached to the upper layer 150. As the voltage is applied, a hermetic seal begins to take place between the two wafers, 150 and 151, reaching completion in about 15 minutes.

The principal of operation is that $TiO_2$ and $Si_3N_4$ layers serve as a barrier to positive alkaline ions which can flow up towards the cathode from the bottom Pyrex wafer 151. This allows the formation of a depletion layer at the bottom surface of the top wafer. Layers other than $TiO_2$ and $Si_3N_4$, which can block alkaline ions also could be used. The gold foil or deposited gold film prevents bonding from taking place at the bottom surface. The bonding mechanism at the borosilicate glass and $TiO_2/Si_3N_4$ interface is then similar to the well documented silicon borosilicate anodic bonding process.

While the most preferred thicknesses of layers and other parameters are listed above, the $TiO_2$ layer is based on a deposited titanium layer that ranges between about 250 Å and 500 Å. After deposition, the titanium is oxidized and the layer will grow. The $Si_3N_4$ layer can be between 2000 Å and 4000 Å. Bonding temperatures in the range between about 250° C. and about 500° C. are useful. Voltages ranging between 500 and 1000 VDC can be used. The temperature for plasma depositing the $Si_3N_4$ is as close to the bonding temperature used as possible.

The glass-glass anodic bond process will work on borosilicate glass or other type of glass having alkali ion glass modifier.

Although the present invention has been described with reference to preferred embodiments, workers skilled in the art will recognize that changes may be made in form and detail without departing from the spirit and scope of the invention.

What is claimed is:

1. A pressure sensor comprising:
   a backing plate;
   a semiconductor material diaphragm having a peripheral rim mounted on the backing plate with portions of the diaphragm within the peripheral rim being deflectable relative to the backing plate under fluid pressure;
   an electrode plate for forming a capacitive pressure sensor in combination with the diaphragm mounted to the diaphragm around the peripheral rim of the diaphragm;
   a support for mounting the pressure sensor relative to a housing for said sensor, the support comprising a glass tube directly supporting the backing plate for stress isolation of the backing plate and the electrode plate relative to the housing; and
   a fluid pressure inlet passing through the support and the backing plate to permit fluid pressure to act on the diaphragm to deflect the diaphragm relative to the electrode plate, to cause a change in spacing between the diaphragm and the electrode plate.

2. The pressure sensor of claim 1 wherein said electrode plate comprises a glass plate having a metalizing layer thereon, said metalizing layer having a first portion on a surface of the electrode plate facing the diaphragm and a second portion on an opposite surface of the electrode plate substantially the same size and thickness, and in registry with the first portion.

3. The pressure sensor of claim 2 wherein said metalizing layer comprises thin film deposited layers of metal adhering to the glass plate.

4. The pressure sensor of claim 1 wherein said backing plate comprises a silicon plate that is substantially thicker than the peripheral rim, said diaphragm comprising a silicon diaphragm and the peripheral rim being fused to a surface of the backing plate.

5. The sensor as specified in claim 4 wherein the backing plate is substantially in the range of four times as thick as the diaphragm peripheral rim, the diaphragm having a deflecting portion substantially thinner than the peripheral rim.

6. The sensor as specified in claim 1 wherein the diaphragm is made of silicon and the backing plate is made of silicon and is at least two and one half times as thick as the peripheral rim of the diaphragm.

7. The pressure sensor of claim 1 wherein said diaphragm is a plate and generally defines a plane, the diaphragm having a thin center web the peripheral rim having a thickness measured perpendicular to the plane of the diaphragm substantially equal to the thickness of the center web, plus twice the spacing from a surface of the center web facing the electrode plate to the electrode plate.

8. The pressure sensor of claim 1 and a housing for supporting the support, said housing comprising a radial fitting of stainless steel having a center through bore, said support being made of a borosilicate glass, and an intermediate pedestal between said support and said fitting comprising a machined shoulder surface surrounding a portion of the center through bore in the fitting, a pilot boss on the pedestal formed by a second shoulder surface and fitting into a portion of said through bore in the fitting, and said second shoulder surface resting on the first shoulder surface on the fitting for positioning the support, said shoulder surfaces being bonded together.

9. The pressure sensor of claim 8 wherein pedestal is made of a nickel-iron alloy.

10. The pressure sensor of claim 9 wherein the nickel-iron alloy pedestal is nickel-plated.

11. The pressure sensor of claim 8 wherein said glass tube is supported on said pedestal, and has an end surface having a metalization of zirconium in contact with the glass tube and facing the pedestal, and a further layer of nickel bonded to the zirconium and soldered to the pedestal.

12. The pressure sensor of claim 1 wherein the backing plate is made of glass.

13. The pressure sensor of claim 12 and a glass to glass anodic bond joining the support means to the backing plate.

14. A pressure sensor assembly comprising:
   an outer housing having a substantially rectangular configuration with a base wall, upstanding sidewalls extending from said base wall, and a cover plate overlying said base wall;
   a pressure sensing die having a pressure fitting formed to extend to the exterior of the housing sealingly mounted on said base wall;
   a reference pressure die constructed substantially identically to the pressure sensing die and sealingly mounted on said base wall and oriented substantially parallel to said pressure sensing die;

electrical connector means sealingly passing through one sidewall; and a pair of mounting studs mounted on said one sidewall adjacent opposite ends thereof, with the electrical connector means therebetween, said studs being welded to the one sidewall for supporting the housing in a usable position.

15. The pressure sensor assembly of claim 14 wherein the pressure sensing die has a pressure fitting portion protruding from the base wall of the housing and said reference pressure die has a portion also protruding from the base wall of the housing to provide a reference pressure sensor that reacts to thermal, mechanical and acceleration forces and stresses substantially identically to the pressure sensing die.

16. The pressure sensor assembly of claim 15 wherein the pressure sensing die and the reference pressure die are each supported relative to the base wall through a separate first metal fitting, a second metal fitting bonded to a bore in each first metal fitting, and a separate glass tube fixedly supported on each second metal fitting and directly supporting the pressure sensing die and reference pressure die, respectively, said second metal fitting having a thermal coefficient of expansion that is intermediate the thermal coefficients of expansion of the first metal fittings, and of the glass tubes.

17. A pressure sensor comprising:

a backing plate made of a rigid material;

a semiconductor material diaphragm mounted on the backing plate, the diaphragm having a support rim around a periphery of the diaphragm, the diaphragm having portions within the support rim which are deflectable relative to the backing plate when under fluid pressure, the backing plate being at least two and one half times as thick as the rim;

an electrode plate forming a capacitive pressure sensor in combination with the diaphragm and mounted to the diaphragm support rim;

a housing for enclosing the pressure sensor;

a glass tube secured to a wall of the housing and directly supporting the backing plate for stress isolation of the backing plate and electrode plate relative to the housing; and a fluid pressure inlet passing through the wall of the housing, the glass tube and the backing plate to permit fluid pressure to act on center portions of the diaphragm to deflect the center portions of the diaphragm relative to the electrode plate, and to cause a change in spacing between the center portions of the diaphragm and the electrode plate.

* * * * *